United States Patent
Trascinelli et al.

(10) Patent No.: US 8,906,186 B2
(45) Date of Patent: Dec. 9, 2014

(54) METHOD FOR MANUFACTURING FILTRATION UNITS AND ASSOCIATED APPARATUS

(75) Inventors: Filippo Trascinelli, Parma (IT); Enrico Colombo, Moglia-Montova (IT); Filippo Branzi, Mizzole-Verona (IT)

(73) Assignee: GVS S.p.A., Zola Predosa-Bologna (IT)

( * ) Notice: Subject to any disclaimer, the term of this patent is extended or adjusted under 35 U.S.C. 154(b) by 696 days.

(21) Appl. No.: 12/451,395

(22) PCT Filed: May 13, 2008

(86) PCT No.: PCT/EP2008/055832
§ 371 (c)(1),
(2), (4) Date: Nov. 9, 2009

(87) PCT Pub. No.: WO2008/138924
PCT Pub. Date: Nov. 20, 2008

(65) Prior Publication Data
US 2010/0116428 A1    May 13, 2010

(30) Foreign Application Priority Data
May 15, 2007   (IT) .............................. MO2007A0162

(51) Int. Cl.
| | |
|---|---|
| *B29C 45/14* | (2006.01) |
| *B29C 33/56* | (2006.01) |
| *B29C 45/37* | (2006.01) |
| *B01D 46/24* | (2006.01) |
| *B01D 46/00* | (2006.01) |
| *B29C 45/73* | (2006.01) |
| *B29L 16/00* | (2006.01) |
| *B29L 31/14* | (2006.01) |

(52) U.S. Cl.
CPC ....... *B29C 45/14467* (2013.01); *B01D 2273/28* (2013.01); *B29K 2907/04* (2013.01); *B29C 33/56* (2013.01); *B29C 45/37* (2013.01); *B01D 46/2414* (2013.01); *B01D 46/0012* (2013.01); *B29C 45/73* (2013.01); *B29L 2016/00* (2013.01); *B29K 2827/18* (2013.01); *B01D 46/0001* (2013.01); *B01D 2265/04* (2013.01); *B29L 2031/14* (2013.01)
USPC .......................................... 156/245; 156/60

(58) Field of Classification Search
USPC ........................................ 156/245; 425/129.1
See application file for complete search history.

(56) References Cited

U.S. PATENT DOCUMENTS

| | | | | |
|---|---|---|---|---|
| 3,133,847 | A | * | 5/1964 | Millington ...................... 156/60 |
| 4,795,524 | A | | 1/1989 | Sakaida |
| 5,980,663 | A | * | 11/1999 | Badehi ............................ 156/64 |
| 2005/0193695 | A1 | * | 9/2005 | Holmes et al. .................. 55/482 |
| 2006/0065587 | A1 | * | 3/2006 | Shigesada et al. ........ 210/321.87 |
| 2006/0288675 | A1 | * | 12/2006 | Chan ............................... 55/498 |

* cited by examiner

OTHER PUBLICATIONS
PCT Search Report dated Jul. 23, 2008.

*Primary Examiner* — Margaret Squalls
(74) *Attorney, Agent, or Firm* — Hedman & Costigan, P.C.; James V. Costigan; Kathleen A. Costigan

(57) ABSTRACT

A method for manufacturing filtration units (2), for example for biomedical use and the like, constituted by a box-like enclosure (3) and a filtration element (4) which can be mutually assembled, comprising a step of injecting a retention element (6) in the fluid state in a seat (5), which is associated with the box-like enclosure, for accommodating the filtration element (4); a step of embedding an end of the filtration element (4) in a portion of the retention element (6) kept in the fluid state; and a step of consolidation of the retention element (6) in order to lock the filtration element (4) in the seat (5), the retention element (6) being a thermoplastic polymeric material which can be applied by hot injection in a preset closed volume of the seat (5).

6 Claims, 5 Drawing Sheets

METHOD FOR MANUFACTURING FILTRATION UNITS AND ASSOCIATED APPARATUS

TECHNICAL FIELD

The present invention relates to a method for manufacturing filtration units particularly for biomedical lines, for example in the fields related to anesthesia, intensive care and heart surgery.

BACKGROUND ART

Filtration units, for example of the single-use type, are known which have the appearance of a body constituted by two parts or shells, between which a filtration element is interposed, such parts or shells being mutually assembled and sealed.

The filtration element can have various shapes, for example a pleated flat or circular shape or another shape, depending on the specific constructive requirements.

As mentioned, the body is provided by means of two shells, which are obtained by molding thermoplastic material: a first shell, which is constituted for example by a first tubular connector, for example of the female Luer-Lok type, in which there is an opening for the passage of a fluid and which expands radially into a first annular flange, and a second shell, which is constituted by a second tubular connector, for example of the male Luer-Lok type, in which there is an opening for the passage of a fluid and which expands radially into a second annular flange, or having other shapes.

The two tubular connectors are designed to be connected for example to the tubes of a biomedical line for hemodialysis or other purposes.

The fluid to be filtered, by passing through the filtration unit, necessarily has to pass between the dense meshes of the membrane-based filtration element and thus be purified of the coarse impurities.

The first and second shells are in fact assembled so that the respective flanges face each other and so that the membrane-based filtration element is interposed between them, providing a forced passage for the fluid.

The main techniques currently in use to anchor the filtration element to the two shells provide for gluing it to each of said shells by means of hot-melt polymeric adhesives or polyurethane resins, which may be centrifuged beforehand. Another of the techniques currently in use provides for welding the filtration element to each shell by means of ultrasound or by heating, with heating lamps or other radiating bodies, a portion of the shell with subsequent embedding of the membrane-based filtration element in the portion of the shell thus heated and rendered partially fluid.

Once the filtration element has been fixed to the two shells, they are mutually assembled and sealed with various known methods, which include, for example, welding by hot-melt adhesive, ultrasound welding, gluing and overmolding thermoplastic material at their joining line.

However, these methods for providing known types of filtration unit and in particular these techniques for fixing the filtration element to the shells of the filtration body are not free from drawbacks, which include the fact that the use of hot-melt adhesives or polyurethane resins to fix the membrane-based filtration element to the shells does not ensure a sufficient mechanical strength and heat resistance of the joint, which is therefore subject to rapid and unpredictable deterioration.

Techniques for fixing the filtration element to the shells of the body of the filtration unit which use ultrasound welding or heating of the support by means of lamps or other radiating bodies also are not free from drawbacks; to perform these techniques, although they still ensure a high mechanical strength and heat resistance of the joint between the filtration element and the shell and therefore of the filtration unit, however, long heating times are required.

Further, another drawback observed in these last techniques for fixing the filtration element to the shell is linked to the excessive costs entailed for apparatuses for the targeted heating of a portion of the shell chosen for the fixing of the filtration element.

Another drawback in these known techniques is that shell size variations occur, therefore leading to the possibility of forming thermal stresses therein due to heating after the step for forming the shell.

DISCLOSURE OF THE INVENTION

The aim of the present invention is to eliminate the drawbacks cited above of the background art, by providing a method for manufacturing filtration units, for example, for biomedical use, which allows to obtain joints between the filtration element and the enclosure, and therefore filtration units, with a high mechanical strength and heat resistance even when the geometries of the filtration element are particularly complicated.

Within this aim, an object of the method according to the invention is to provide a joint between the filtration element and the enclosure which has rapid production times and is easy to perform in practice, so as to increase the efficiency of the process for manufacturing said filtration units.

Another object of the method according to the invention is to provide a joint between the filtration element and the enclosure which maintains the same structural, mechanical, thermal and biocompatibility characteristics of the shell itself.

Another object is to reduce costs due to the heating of the thermoplastic material used for the joint between the filtration element and the enclosure, optimizing the process for providing said joint.

A further object of the present invention is to provide a method which is simple, relatively easy to provide in practice, safe in use, effective in operation, and has a relatively low cost.

This aim and these and other objects which will become better apparent hereinafter are achieved by the present method for manufacturing filtration units, for example for biomedical use and the like, which are constituted by at least one box-like enclosure and at least one filtration element which can be mutually assembled, characterized in that it comprises a step of injecting at least one retention element in the fluid state in at least one seat, which is associated with said box-like enclosure, for accommodating said filtration element; at least one step of embedding at least one end of said filtration element in at least one portion of said retention element kept in the fluid state, and in that it comprises a step of consolidation of said retention element in order to lock said filtration element in said seat, said retention element being a thermoplastic polymeric material which can be applied by hot injection in at least one preset closed volume of said seat.

BRIEF DESCRIPTION OF THE DRAWINGS

Further characteristics and advantages of the present invention will become better apparent from the following detailed description of a preferred but not exclusive embodiment of an apparatus for applying the method for manufacturing filtration units for biomedical use and the like, illustrated by way of non-limiting example in the accompanying drawings, wherein.

WAYS OF CARRYING OUT THE INVENTION

Figure 1:
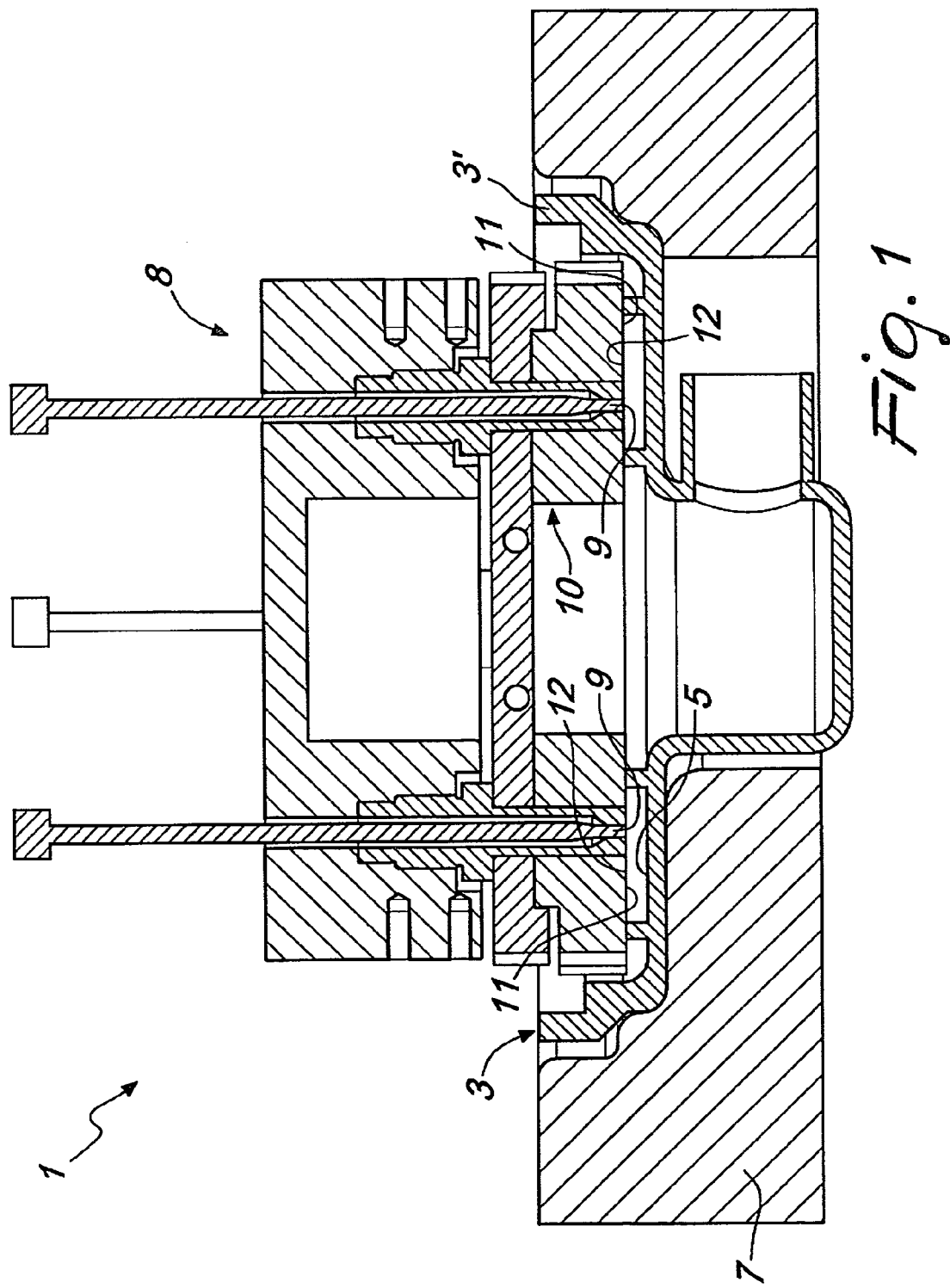
FIG. 1 is a sectional side view of the apparatus according to the invention before the step of injection of the retention element.
Figure 2:
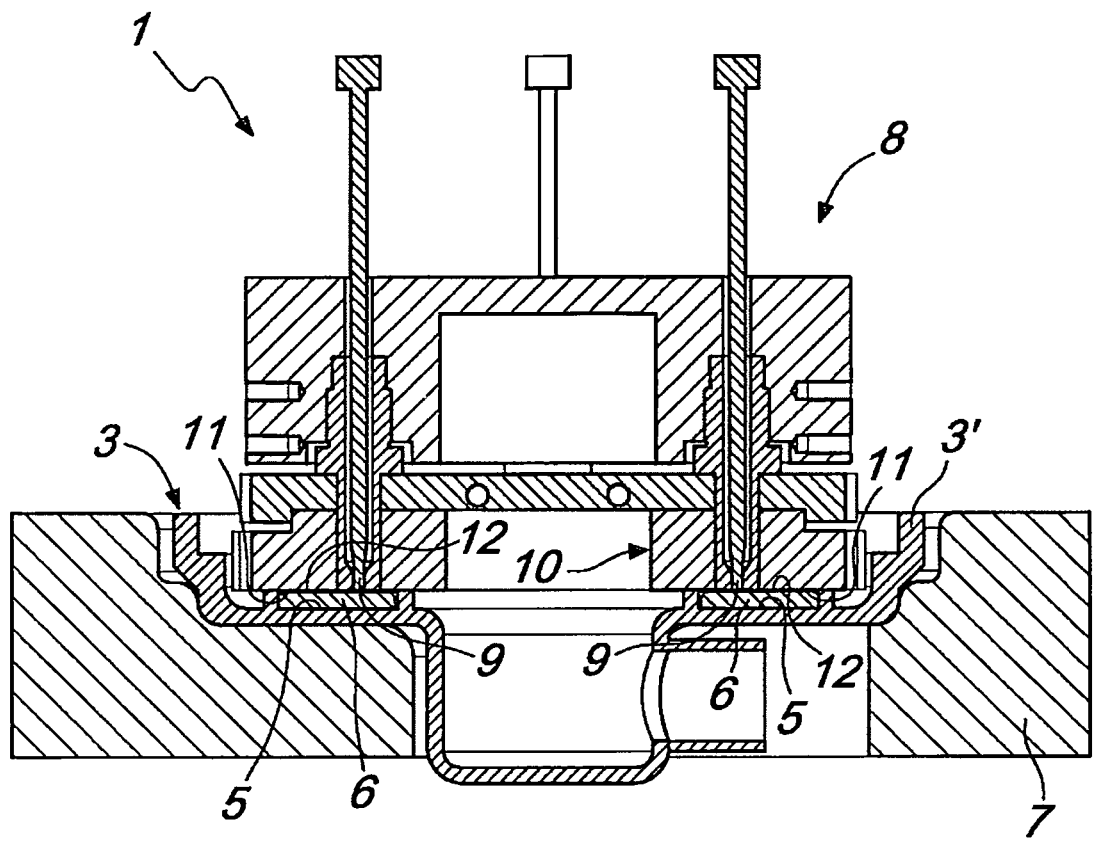
FIG. 2 is a sectional side view of FIG. 1 after the injection step has ended.
Figure 3:
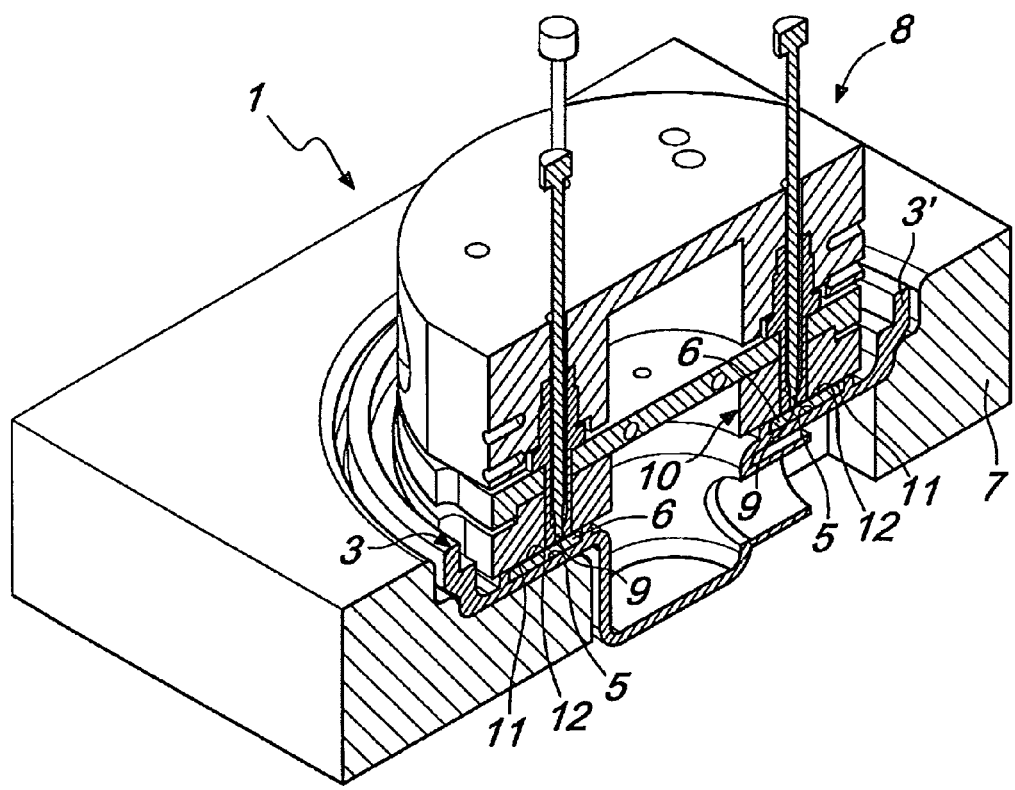
FIG. 3 is a perspective sectional side view of FIG. 2.
Figure 4:
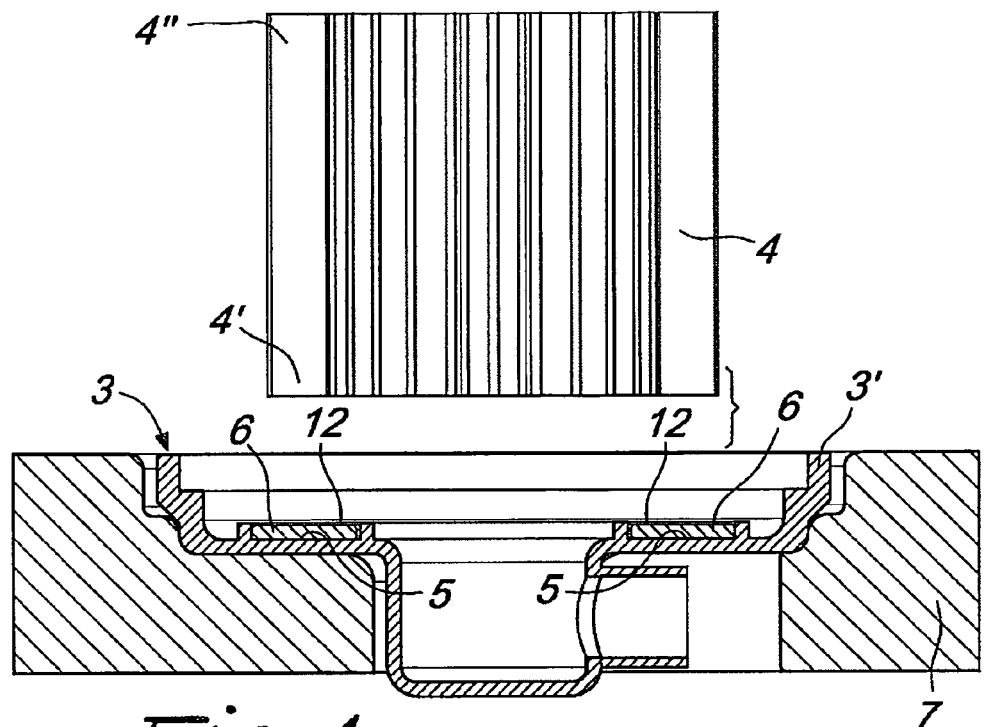
FIG. 4 is a sectional view of the enclosure before the step for embedding the filtration element.
Figure 5:
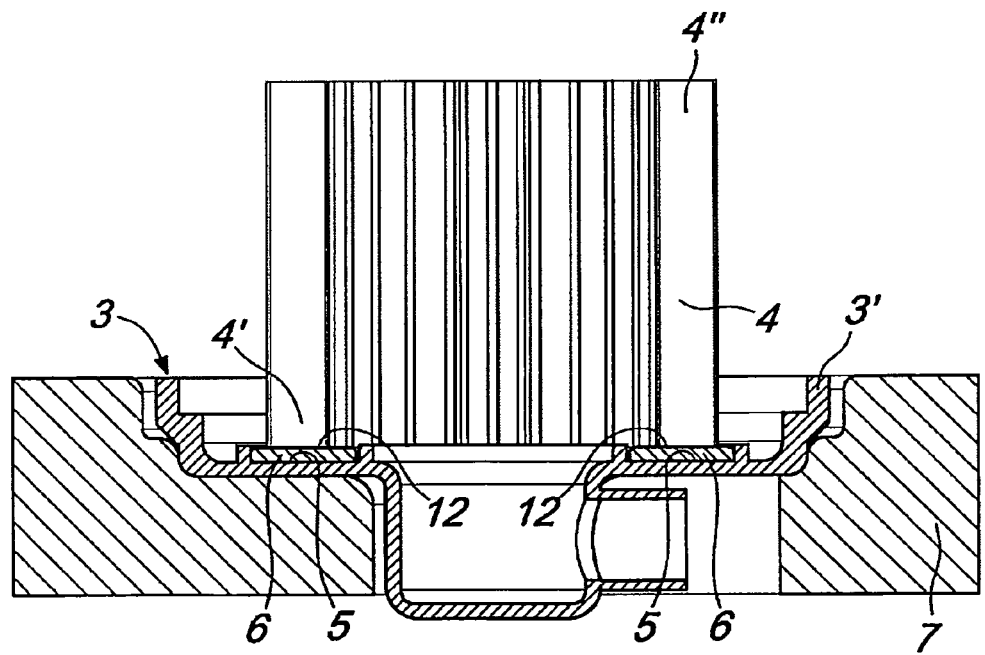
FIG. 5 is a sectional view of the enclosure during the embedding and consolidation step.
Figure 6:
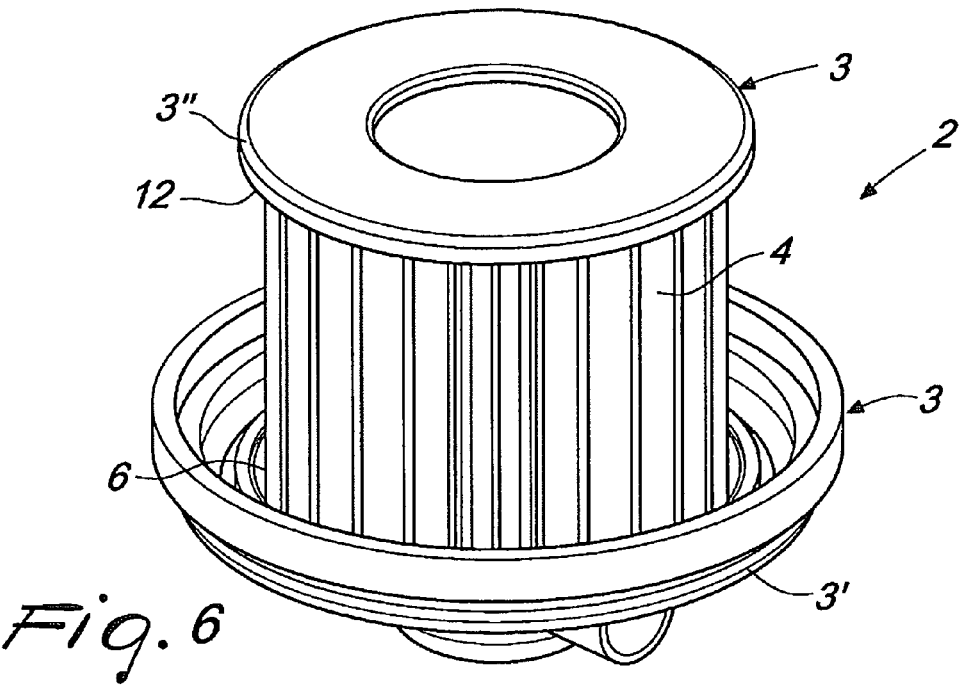
FIG. 6 is a perspective view of the filtration unit provided with the method and the apparatus according to the invention.
Figure 7:
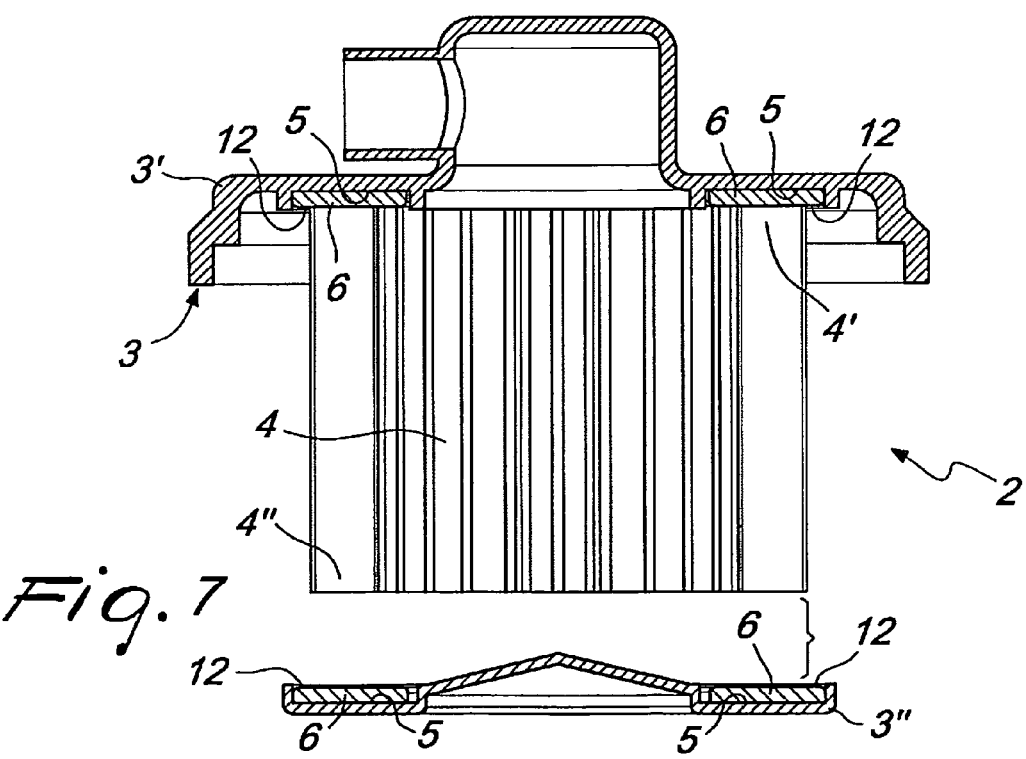
FIG. 7 is a sectional view of FIG. 6.

With reference to the figures, the reference numeral 1 generally designates an apparatus for manufacturing filtration units, for example for biomedical use and the like, generally designated by the reference numeral 2. In particular, the filtration unit 2 is constituted generally by a box-like enclosure 3 and a filtration element 4 which can be mutually assembled.

The filtration element 4 is, for example, a flat or circular pleated membrane-based filter made of polypropylene and/or polyester and/or Nylon.

In a preferred but not exclusive embodiment, the enclosure 3 is divided into a first shell and a second shell, respectively 3' and 3", which are connected respectively to the intake and discharge duct for the liquid or gas to be filtered, between which the filtration element 4 is interposed to filter the fluid. Generally, the enclosure 3 is provided by hot-molding a thermoplastic polymeric material.

Each one of the shells 3' and 3" of the enclosure 3 comprises at least one seat 5 for accommodating an element 6 for retaining the filtration element 4, said seat being formed in at least one portion of the enclosure and having different geometries depending on the construction requirements of the filtration unit 2.

In particular, the retention element 6 is made of a thermoplastic polymeric material, for example polycarbonate, polypropylene or other technically equivalent material, which after being brought to a fluid state is adapted to retain the filtration element 4 after its consolidation.

The apparatus 1 comprises means 7 for supporting the enclosure 3 and, in particular, each shell 3' and 3", which are arranged on opposite sides with respect to the portion of the enclosure in which the seat 5 is provided, and have a geometry which is complementary with respect to the enclosure.

The supporting means 7 can, for example, be cooled beforehand to allow dimensional stability of the enclosure 3.

The apparatus 1 comprises means 8 for injecting the retention element 6 in the fluid state in the seat 5, which in particular comprise at least one port 9 for dispensing the retention element, which faces the seat 5, and means 10 for the hermetic closure of said seat.

For example, the injection means comprise an injector which is commonly used for thermoplastic polymeric materials and/or a plunger-type screw feeder.

The bottom and the side walls of the seat 5, in collaboration with the closure means 10, form a closed volume for filling the entire seat with the retention element.

Advantageously, such closure means 10 comprise at least one face 11, which is kept in contact with a surface 12 of the retention element 6; the face 11 is made of at least one thermally insulating material and is preheated to keep such surface in the fluid state.

The closure means 10 and in particular the face 11 are, for example, made of at least one among a metallic and/or ceramic and/or fluorinated engineering polymeric material or other engineering polymers or resins.

Advantageously, such materials have shapes which are worked and contoured so as to optimize the step for injection of the retention element 6 in the fluid state.

If the closure means 10 and in particular the face 11 are made of metallic and/or ceramic material, they can have surface coating treatments, such as Teflon coating, "Diamond Like Carbon" coating, or others which are known to the person skilled in the art.

Further, the face 11 comprises a non-stick region which is in contact with the surface 12 in order to keep said surface in the fluid state and avoid the problem of the formation of films of consolidated thermoplastic material at said surface.

In particular, the face 11 is entirely made of a material which is inherently non-stick, such as for example polytetrafluoroethylene (PTFE), or treated so as to not stick to the thermoplastic material in the fluid state, for example by way of surface coating treatments, as described earlier.

Further, the injection means 8 are provided with controlled heating means, for example of the type of electric resistors or others, for bringing to the fluid state and keeping thereat the retention element 6 to be injected and already injected.

Finally, the injection means are provided with means for detecting the temperature of the retention element, for example thermocouples or others, which are associated with the discharge port 9 and with the face 11 to control the temperature of the retention element to be injected and already injected in the seat 5.

The method for providing the filtration unit 2 according to the invention is as follows.

First of all, the method comprises at least one step for the injection of the retention element 6 in the fluid state in the at least one seat 5 for accommodating the filtration element 4, which is associated with the enclosure 3. The injection step is performed by arranging the injection means 8 so that they face the seat 5 to inject said retention element; in particular, the discharge outlet 9 and the hermetic closure means 10 face the seat 5 during the injection step.

In particular, as mentioned, the retention element 6 is made of a thermoplastic polymeric material which can be applied by hot injection molding in at least one preset closed volume of the seat 5.

The seat 5 and the closure means 10 are such as to provide the closed volume for injection and filling of the entire seat with the retention element 6.

The method further comprises the step for providing a vacuum region within the seat 5 for the pressurized injection of the retention element 6 in the seat and thus for optimizing the injection step.

Advantageously, the method according to the invention comprises keeping at least the surface 12, which faces the injection means 8, in the fluid state; as mentioned, the face 11 is made of thermally insulating non-stick material.

The injection step comprises the heating of the retention element 6 to bring to a fluid state and keep therein said retention element throughout the injection step and after it by means of the controlled heating means.

The method further comprises controlling the temperature of the retention element 6, which must remain in the fluid state after the injection step in order to allow the embedding of the filtration element 4; this control occurs by way of the sensing means.

The method according to the invention in fact subsequently comprises at least one step for embedding at least one end 4' of the filtration element 4 in at least one portion of the retention element 6 which is kept in the fluid state, and finally comprises a step for consolidating, by cooling, the retention element in order to retain the filtration element 4 to the first shell 3'.

In particular, the method comprises a plurality of steps for embedding injection for each shell 3' and 3" according to the number of the ends 4' of the filtration element 4 to be fixed to the enclosure 3 and according to the geometry thereof.

After the step for injecting the retention element 4 in the first shell 3', the embedding of the end 4' in the retention element 4 and its consolidation, the method comprises the step of rotating the filtration element 4, which is thus fixed to the first shell 3', in order to fix it, in the same manner described above, to the second shell 3".

In particular, a new step for injecting the retention element 4 in a seat 5 which is associated with the second shell 3", and a new step for embedding a new end 4" of the filtration element 4, for example located on the opposite side with respect to the end 4' are performed. Finally, a subsequent step is performed for consolidation of the retention element itself, consequently providing the finished filtration unit 2.

In practice it has been found that the described invention achieves the proposed aim and objects, and in particular the fact is stressed that the method for providing filtration units for biomedical use, as studied, allows to obtain joints between the filtration element and the enclosure, and therefore filtration units, having high mechanical strength and heat resistance even when the geometries of the filtration element are particularly complex.

Further, the method according to the invention allows to provide a joint between the filtration element and the enclosure which has quick production times and is easy to perform in practice, so as to increase the efficiency of the process for manufacturing the filtration units.

It has been found that the method according to the invention allows to provide a joint between the filtration element and the enclosure which maintains the same structural, mechanical, thermal and biocompatibility characteristics as said shell and at the same time allows to reduce the costs and times due to the heating of the thermoplastic material used for the joint between the filtration element and the enclosure, thus optimizing the process for providing said joint.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements without thereby abandoning the scope of the protection of the appended claims.

The disclosures in Italian Patent Application No. MO2007A000162 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method for manufacturing filtration units, comprising a structure having a box-like enclosure and at least one filtration element where said at least one filtration element is locked in a thermoplastic retention element in a seat in said box-like enclosure said method comprises:
   (a) injecting with injection means, said retention element which is a thermoplastic polymeric material in a fluid state, into a space in said box-like enclosure, which is adapted to engage said filtration element where said space is defined by a seat having a bottom and two side walls and in collaboration with a closure means of an apparatus having hermetic closure means that form a closed volume with said seat in said box-like structure for containing said thermoplastic retention element, said hermetic closure means having a face with at least one non-stick region which contacts a surface of said retention element wherein said apparatus comprises said injection means wherein said injection means has a port for dispensing said thermoplastic polymeric material in a fluid state into said seat in said box-like element to form said thermoplastic retention element;
   (b) embedding at least one end of said filtration element in at least one portion of said thermoplastic retention element while said thermoplastic retention element is in the fluid state so that said filtration element is locked to said seat of said box like enclosure; and
   (c) providing a region within said seat where said region is under a vacuum for receiving said retention element in said seat where said retention element is injected under pressure; and
   (d) solidifying said thermoplastic retention element to form a solidified retention element in order to lock said at least one filtration element in said seat of said box like enclosure.

2. The method according to claim 1, wherein said retention element which is a thermoplastic polymeric material comprises polycarbonate or polypropylene.

3. The method according to claim 1, which comprises keeping at least one surface of said retention element, in the fluid state and said closure means has at least one face made of thermally insulating material and said closure means are preheated where said closure means contact said surface of said retention element.

4. The method according to claim 1, wherein step (a) comprises heating said retention element in order to keep said retention element in a fluid state during step (a), said injection means being provided with controlled heating means.

5. The method according to claim 1, which includes controlling the temperature of the retention element to maintain the retention element in the fluid state during step (a) and step (b), said injection means being provided with temperature detecting means for detecting the temperature of said retention element, said temperature detecting means being associated with said dispensing outlet and with said face.

6. The method according to claim 1, which includes a step of rotating said filtration element with one end embedded in said solidified retention element in a first shell of said box-like enclosure in order to embed an end of said filtration element which is opposite the one end embedded in said solidified retention element state in a new seat which is associated with a second shell of said box like enclosure where a portion of a retention element in the fluid state has been previously positioned.

* * * * *